Figure 1:
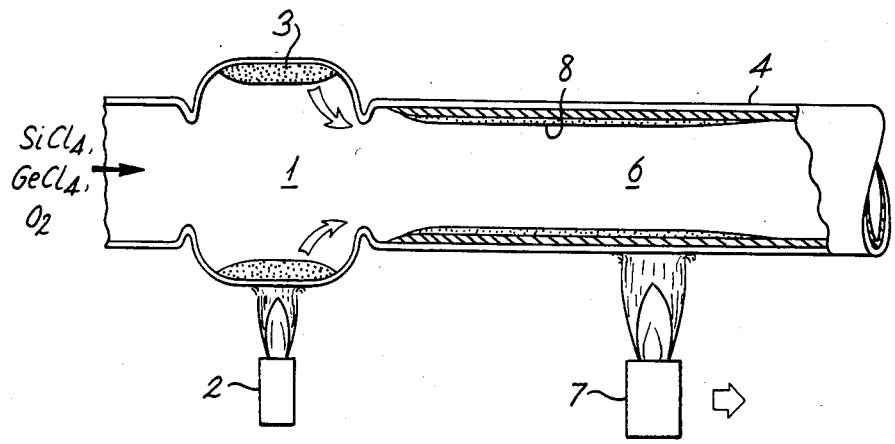

United States Patent [19]

Mears et al.

[11] Patent Number: 4,787,927
[45] Date of Patent: Nov. 29, 1988

[54] FABRICATION OF OPTICAL FIBERS

[75] Inventors: Robert J. Mears; Laurence Reekie; Simon B. Poole; David N. Payne, all of Hampshire, England

[73] Assignee: National Research Development Corporation, London, England

[21] Appl. No.: 64,943

[22] PCT Filed: Aug. 13, 1986

[86] PCT No.: PCT/GB86/00484
§ 371 Date: Apr. 9, 1987
§ 102(e) Date: Apr. 9, 1987

[87] PCT Pub. No.: WO87/01110
PCT Pub. Date: Feb. 26, 1987

[30] Foreign Application Priority Data

Aug. 13, 1985 [GB] United Kingdom ............... 8520300
Aug. 13, 1985 [GB] United Kingdom ............... 8520301

[51] Int. Cl.$^4$ .................................... C03B 37/023
[52] U.S. Cl. .................................... 65/3.12; 65/18.2; 472/163
[58] Field of Search ............... 65/3.11, 3.12, 18.2; 427/163

[56] References Cited

U.S. PATENT DOCUMENTS

| | | | |
|---|---|---|---|
| 3,971,645 | 7/1976 | Bachmann | 65/3.12 |
| 4,067,709 | 1/1978 | Stanton | 65/3.12 |
| 4,188,089 | 2/1980 | Gliemeroth | 350/96.34 |
| 4,529,427 | 7/1985 | French | 65/3.12 |
| 4,597,787 | 7/1986 | Jacobson | 65/3.12 |

OTHER PUBLICATIONS

Electronics Letters, vol. 21, No. 17, 15 Aug. 1985 (GB) S. B. Poole et al., "Fabrication of Low-Loss Optical Fibers Containing Rare-Earth Ion", pp. 737,738.
Japanese Journal of Applied Physics, vol. 22, No. 8, Aug. 1983, part 2, (Tokyo, JP) Seiko Mitachi: "Reduction of Impurities in Fluoride Glass Optical Fiber", pp. L537–L538.

Primary Examiner—Robert L. Lindsay
Attorney, Agent, or Firm—Cushman, Darby & Cushman

[57] ABSTRACT

A method of making a preform for drawing optical fibers includes the steps of depositing a dopant material 3 in a dopant carrier chamber 1, heating the dopant material to cause it to vaporise at a predetermined rate, depositing from a mixture of a source material (GeCl$_4$, SiO$_4$, O$_2$) and said vaporised dopant a mixture of solid components 8 and fusing said solid components to form a doped glass.

8 Claims, 4 Drawing Sheets

FABRICATION OF OPTICAL FIBERS

This invention relates to the fabrication of fibres suitable for the transmission of optical radiation, that is, radiation of ultra-violet, visible and infra-red wavelengths.

The ability to introduce small amounts of impurity dopants, e.g. rare-earth or transition metal ions, into the core or cladding of an optical fibre is useful for a number of reasons.

The fabrication of optical fibre amplifiers or lasers using for example neodymium or erbium as the impurity dopant is possible. An example of a neodymium fibre laser is described in our copending United Kingdom Patent Application No. 8520301.

The incorporation of, for instance, Terbium ions ($Tb^{3+}$) into the silica glass matrix is well known to increase the Verdet constant of the glass and this is an advantage for fibre devices or sensors which interact with magnetic fields.

A distributed temperature sensor may be constructed which utilises temperature-dependent changes in either the absorption spectrum or fluorescence decay-time of a rare-earth or transition metal ion, e.g. $Nd^{3+}$ or $Cr^{3+}$, to indicate the temperature of the medium surrounding the fibre.

The introduction of, for instance, $Nb^{3+}$ ions into the silica glass matrix is known to increase both the Kerr effect and the non-linear optical coefficients of the glass.

The introduction of certain ions, e.g. Cerium, into the glass allows the construction of scintillation counters by converting the energy of an incident high-energy particle or beam to an optical signal which propagates within the fibre.

We have devised a new fabrication technique which allows the fabrication of optical fibres containing controllable, low (<1 wt %) amounts of one or more impurity dopant ions in one or both of the core or cladding glass of an optical fibre. The technique permits the use of starting materials, e.g. rare-earth halides, which have a high melting point and hence have hitherto been unusable, since they exhibit a very-low vapour pressure at the temperatures commonly encountered in reactant delivery systems for optical fibre fabrication. This temperature is usually limited to around 250° C., at which temperature the PTFE components used in the rotating seal connecting the deposition tube to the reactant delivery system begin to deform. Our process is also applicable to liquids which have a low vapour pressure at low temperatures (<250° C.).

The impurity dopant(s) introduced into the glass using the technique may themselves create the refractive-index difference(s) required for the fibre to guide light. Alternatively, the index difference may be achieved in combination with commonly-used optical fibre dopants, such as for example, Boron trioxide, Fluorine, Germania, Phosphorous pentoxide and Titania. The technique is unique in that it allows the fabrication of long lengths of fibres containing, for instance, rare-earth ions, which have a relatively-high absorption in the visible/near infra-red region, whilst substantially maintaining the low-loss properties of communications-grade fibres at other wavelengths.

According to the present invention, there is provided a method of fabricating a preform for the manufacture of optical fibres incorporating a doped glass characterised in that said method includes the sequential steps of depositing a dopant material in a dopant carrier chamber, heating the dopant within said chamber to cause said dopant to vaporise at a prdetermined rate, passing a gaseous source material through said carrier chamber to mix said dopant material with said source material, depositing from the mixture of said source material and said dopant material a mixture of solid components, and fusing said solid components to form a doped glass for said preform.

Preferably the method includes the sequential steps of
(i) depositing one or more dopant materials into one or more dopant carrier chambers,
(ii) heating the said chamber(s) under a dehydrating atmosphere to purify the said dopants and, in the case of solid dopants, to fuse the said dopant(s) to the said chamber(s) walls,
(iii) heating the dopant(s) within said chamber(s) to cause said dopant(s) to vaporise at a predetermined rate whilst passing gaseous source materials through said carrier chamber(s) to mix said dopant material(s) with said source materials,
(iv) depositing from the mixture of said source material(s) and said dopant material(s) a mixture of solid components,
(v) heating the deposited mixture under a dehydrating atmosphere to purify the deposited mixture,
(vi) fusing said solid components to form a deposited glass,
(vii) collapsing the hollow tube down to a solid rod,
(viii) drawing said rod to form an optical fibre.

Of the above, steps (i) and (ii) may be performed either before mounting the tube in a preform fabrication lathe, or with the tube mounted in the lathe. Steps (iii) and (iv) will always be performed with the deposition tube mounted in the fabrication lathe. Steps (v) to (vii) may be performed either with the tube mounted in the fabrication lathe or during the fibre draw process (Step (viii).

Figure 2:
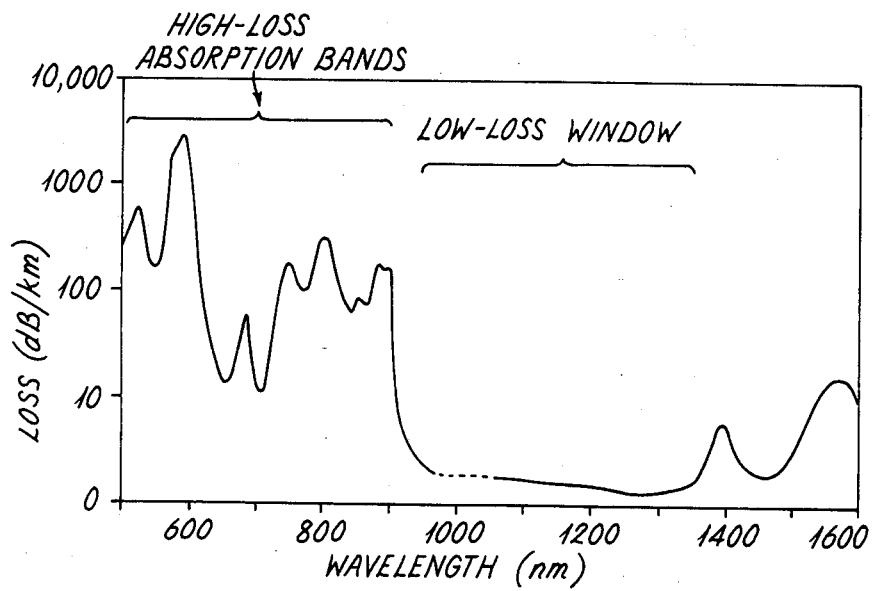
Figure 3:
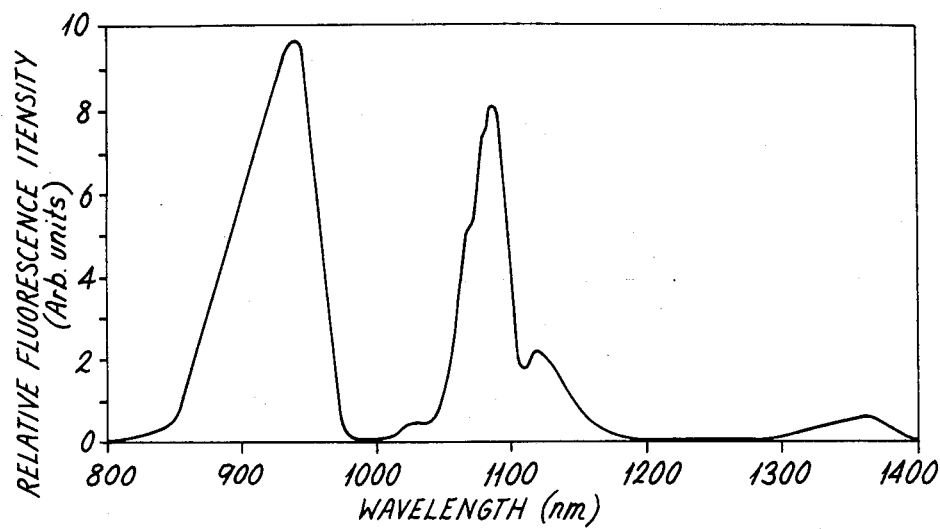
Figure 5:
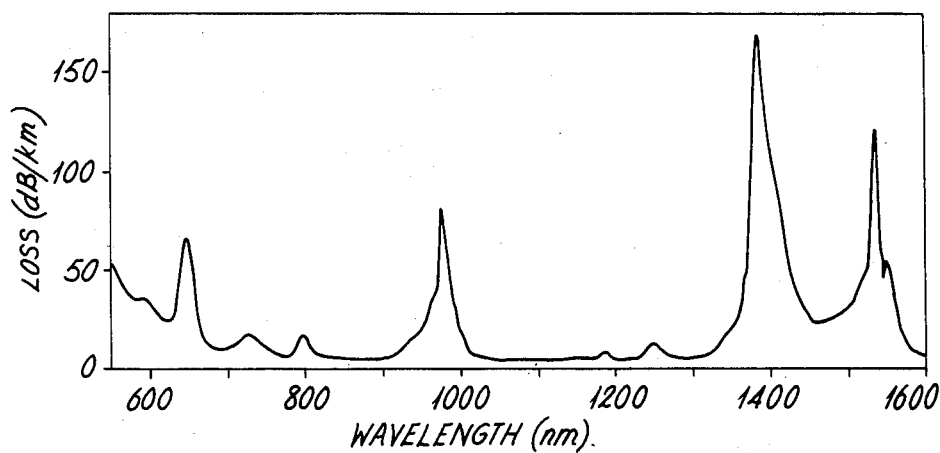
Figure 4A:
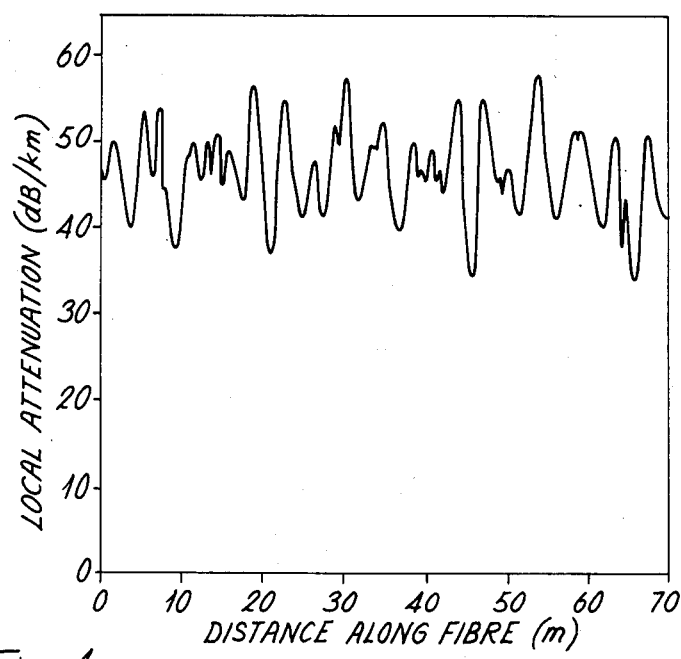
Figure 4B:
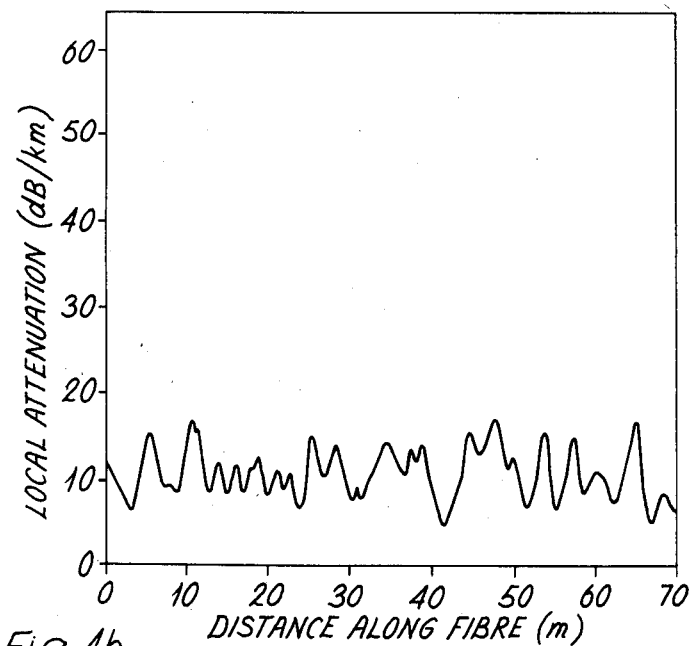
Figure 6:
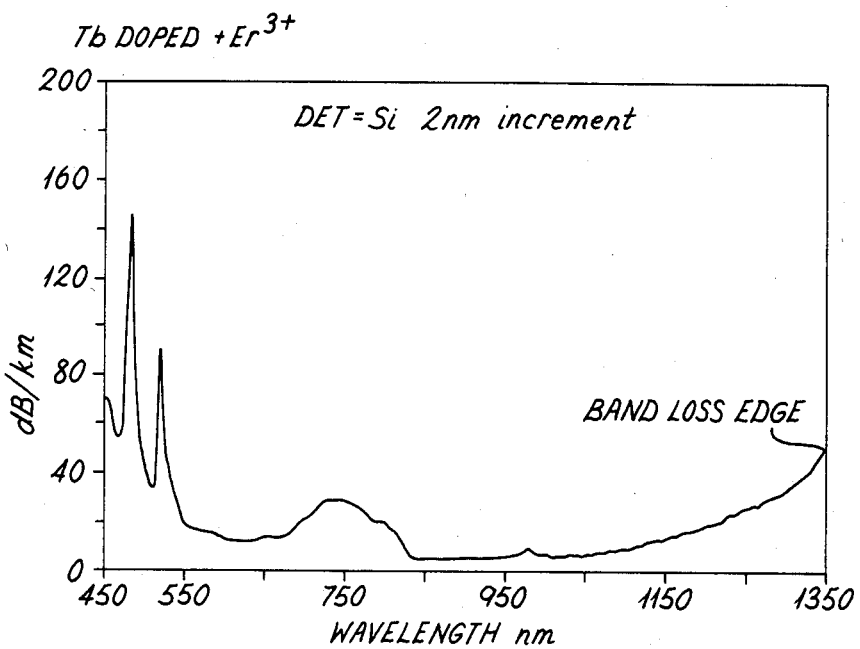

The invention will now be described with reference to the accompanying drawings in which:

FIG. 1 shows the chemical-vapour-deposition apparatus used in the fabrication of optical fibres, FIG. 2 is the absorption spectrum of a fibre containing ~30 ppm $Nd^{3+}$, FIG. 3 is the fluorescence spectrum of a fibre containing ~300 ppm $Nd^{3+}$, FIG. 4(a) is the local attenuation of a $Nd^{3+}$-doped single mode fibre, FIG. 4(b) is the corresponding absorption of a reference fibre, FIG. 5 is an absorption spectrum showing losses due to hydroxyl ion absorption, and FIG. 6 shows the absorption spectrum of a single-mode fibre co-doped with $Tb^{3+}$ and $Er^{3+}$ ions in the core region.

A specific embodiment of the invention will now be described with reference to FIG. 1. This allows the use of a single starting dopant which has a melting point >250° C. (i.e. is a solid at temperatures below the melting point of PTFE) and which is to be incorporated into the core of a single-mode fibre.

Prior to deposition, a deposition tube is prepared by introducing the required dopant into a dopant carrier chamber 1 where it is purified by heating under a dehydrating atmosphere, e.g. one containing either gaseous chlorine or gaseous fluorine, using a stationary heat source, e.g. burner 2. This step also fuses the dopant material to the chamber wall, preventing particles of the dopant passing down the tube and forming bubbles in the glass subsequently deposited. The inside of the deposition tube 4 is then cleaned by gas-phase etching using fluorine generated by thermally decomposing a fluorine-containing compound, e.g. sulphur hexafluoride ($SF_6$) or a halocarbon, such as $CCl_2F_2$ to remove any dopant deposited during the drying process, following which, the cladding glass 8 is deposited. During the subsequent core deposition, the dopant carrier chamber is heated to a temperature at which the solid impurity dopant either sublimes or becomes a liquid with a partial vapour-pressure of a few millimetres of mercury, which occurs typically at 900° to 1200° C. This produces small quantities of impurity vapour which is carried downstream by the reactant flow, where it is oxidised in the hot-zone 6 formed by the deposition burner and deposited unfused at a low temperature (typically <1600° C.) along with other core-forming materials, e.g. $SiO_2$, $P_2O_6$, $GeO_2$. The porous glass layer is then further dried by heating under a dehydrating atmosphere, after which it is fused to form a clear non-porous layer. The tube is then collapsed to form a solid rod and pulled into a fibre.

A further specific embodiment of the invention is the fabrication of single- and multi-mode optical fibres doped with, for example, neodymium ions, $Nd^{3+}$, in the core region.

Referring now to FIGS. 2 to 4, the deposition process was performed in a similar manner to that generally described previously, the source of the dopant vapour being hydrated neodymium trichloride, $NdCl_3.6H_2O$ (99.9% pure, melting point=758° C.). This was dehydrated and purified by heating within the tube under a chlorine atmosphere, following which the tube was cleaned by gas phase etching using a fluorine-liberating vapour, such as Sulphur hexafluoride ($SF_6$). A number of low loss cladding layers were then deposited sufficient to give a cladding diameter to core diameter ratio in the collapsed preform of greater than 7:1. This was necessary to prevent excess loss due to the ingress of OH— and other impurity ions from the substrate tube into the regions of the fibre in which there is substantial field penetration by the guided modes. The fibre core was then deposited unfused, whilst heating the dopant carrier chamber as described previously, such that the $NdCl_3$ vapour produced in the dopant carrier chamber was oxidised to $Nd_2O_3$ within the hot-zone. The core layer was subsequently dried under a chlorine atmosphere and sintered before collapsing the tube to a solid rod.

Absorption measurements on mono- and multi-mode fibres show that neodymium is incorporated into the glass matrix as the trivalent $Nd^{3+}$ ion. Fibres with absorption peaks (at 590 nm) ranging from 30 dB/km to 30,000 dB/km (corresponding to dopant levels of 0.3 to 300 ppm of $Nd^{3+}$) have been fabricated. The absorption spectrum for a 500 m length of neodymium doped fibre having a dopant level of ~30 ppm is shown in FIG. 2. The very high absorption levels in the visible and near infra-red regions of up to 3000 dB/km can be clearly seen. Despite this high loss, it is remarkable to observe the existence of a low-loss window between 950 and 1350 nm of <2 dB/km, a figure not very different from that observed in conventional fibres. The low OH— absorption peak at 1390 nm indicates the success of the techniques used to dry the neodymium compounds, both before and during the deposition.

The fluorescence spectrum of a fibre doped with ~300 ppm $Nd^{3+}$ is shown in FIG. 3, where broad fluorescence bands with peak wavelengths of 940, 1080 and 1370 nm can be clearly seen. As a result of the high silica host glass, the bands are shifted to slightly longer wavelengths than the corresponding bands in compound glasses used for conventional lasers. Measurements of the 1/e fluorescence lifetime using a 590 nm pump wavelength gave a figure of 450 μs for both the 940 nm and 1080 nm transitions. In addition, the consistency of the dopant incorporation along the fibre length has been resolved by measuring the local attenuation along the fibre length using an OTDR technique. The source wavelength of 620 nm is chosen to lie on the tail of the 590 nm absorption band so as to achieve a manageable attenuation. The results are shown in FIGS. 4(a and b) and indicate good uniformity of dopant incorporation along the length of the fibre, thus indicating the high degree of control in the fabrication process.

In another specific embodiment of the technique, we have fabricated highly-birefringent and single-polarisation fibres containing $Nd^{3+}$ ions in the core region. These were obtained by combining the technique described previously for the incorporation of impurity dopants into the fibre core with the well-known gas-phase etching technique for fabricating asymmetrical, highly-stressed "Bow-Tie" fibres, as described in our copending United Kingdom Patent Application No. 8218470. Fibres with a beat-length as short as 2 mm combined with dopant levels of >200 ppm $Nd^{3+}$ have been obtained using this method.

In another specific embodiment, we have produced mono- and multi-mode fibres containing $Er^{3+}$ ions in concentrations up to 0.25 wt % $Er^{3+}$. This will be explained with reference to FIG. 5 which shows the absorption spectrum of a mono-mode fibre doped with ~2 ppm $Er^{3+}$ in the core region.

The fibre was fabricated as described previously for $Nd^{3+}$ doped fibres, but with the precursor material being hydrated erbium trichloride, $ErCl_3, 6H_2O$ (99.9% pure, melting point=744° C.). The remainder of the fabrication process was as previously described, with the exception that very few low-loss cladding layers were deposited such that in the resulting fibre pulled from the preform, the ratio of cladding diameter to core diameter was ~2:1. Consequently, there was penetration of the substrate tube by the field nominally confined to the fibre core, which gives a higher than expected loss due to OH— absorption at 1390 nm as seen in FIG. 5. Fibres containing up to 0.25 wt % $Er^{3+}$ have been fabricated using this technique, which gives losses of less than 40 dB/km in the region between 1 μm and 1.3 μm, despite absorption band peaks of >50 dB/m.

A further specific embodiment concerns a fibre containing Terbium ions $Tb^{3+}$ co-doped with Erbium, $Er^{3+}$, ions in the core region. This was fabricated as previously described, with the exception that a mixture of terbium trichloride and erbium trichloride was placed in the dopant carrier chamber prior to the commencement of deposition. Fibres pulled from such a preform have exhibited similar absorption characteristics as shown in FIG. 6, in which the large absorptions peak at 486 nm and the broad absorption centred on 725 nm are due to the presence of $Tb^{3+}$ ion, whilst the absorptions at 518 and 970 nm are due to the presence of $Er^{3+}$ ion. This illustrates the possibility of co-doping the deposited glass with multiple impurity ions.

The method may also be used to incorporate other rare-earth and transition metal ions into optical fibres.

It should be understood that the technique as described above is applicable to all fibre types capable of being fabricated by the so-called modified chemical vapour deposition process (MCVD), namely:
(i) Single-Mode fibres
(ii) Multimode fibres
(iii) Highly-birefringent and single polarisation fibres
(iv) Circularly-birefringent (helical core) fibres
(v) Multiple-core fibres
(vi) "Ring-core" fibres.

We claim:

1. A method of fabricating a preform for the manufacture of optical fibres incorporating a doped glass in which a dopant material is deposited in a dopant chamber and is subsequently vaporized from said chamber and deposited on the inner surface of a tubular glass member, comprising the sequential steps of:

heating the dopant chamber to fuse said dopant to the chamber wall, subsequently heating said chamber to cause said dopant to vaporize at a predetermined rate, passing a gaseous source material through said dopant chamber to mix said dopant material with said source material, depositing from the mixture of said source material and said dopant material a mixture of solid components on said inner surface, and fusing said solid components on said inner surface to form a doped glass for said preform.

2. A method of fabricating a preform according to claim 1 characterised in that said method further includes the step of heating the dopant carrier chamber whilst maintaining a dehydrating atmosphere therein.

3. A method of fabricating a preform according to claim 1 characterised in that said dopant contains a rare-earth or transition metal element.

4. A method of fabricating a preform according to claim 3 characterised in that the rare-earth element is neodymium.

5. A method of fabricating a preform according to claim 3 characterised in that the rare-earth element is erbium.

6. A method of fabricating a preform according to claim 3 characterised in that the rare-earth element is terbium.

7. A method of fabricating a preform according to claim 1 characterised in that the dopant includes a plurality of impurity ions.

8. A method of fabricating a preform according to claim 7 characterised in that the dopant includes terbium and erbium.

* * * * *